(12) United States Patent
Reibold (10) Patent No.: US 8,480,540 B2
(45) Date of Patent: Jul. 9, 2013

(54) METHOD FOR CONTROLLING A FRICTION CLUTCH AND DEVICE THEREFOR

(75) Inventor: Ekkehard Reibold, Lahr (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/594,990

(22) Filed: Aug. 27, 2012

(65) Prior Publication Data

US 2012/0322618 A1  Dec. 20, 2012

Related U.S. Application Data

(63) Continuation of application No. PCT/DE2011/000140, filed on Feb. 14, 2011.

(30) Foreign Application Priority Data

Mar. 4, 2010  (DE) .......................... 10 2010 010 138

(51) Int. Cl.
*B60W 10/02*  (2006.01)

(52) U.S. Cl.
USPC ........................................................ 477/180

(58) Field of Classification Search
USPC .................................. 477/174, 180
See application file for complete search history.

(56) References Cited

U.S. PATENT DOCUMENTS 7,412,316 B2 *  8/2008 Gerhart et al. .................. 701/51
2002/0128763 A1  9/2002 Jager et al.

FOREIGN PATENT DOCUMENTS

| DE | 102005057844 | 6/2006 |
|----|--------------|--------|
| DE | 102006011350 | 9/2007 |
| DE | 102008032476 | 1/2010 |
| DE | 102008041353 | 2/2010 |
| EP | 2009313      | 12/2008 |

\* cited by examiner

*Primary Examiner* — Edwin A Young
(74) *Attorney, Agent, or Firm* — Simpson & Simpson, PLLC (57) ABSTRACT

A method and device for controlling a friction clutch arranged between an internal combustion engine and a transmission by means of a clutch actuator that axially actuates an actuating element of the friction clutch along an actuation path associated, by means of a clutch characteristic, with a target torque that can be transmitted by means of the friction clutch. To improve the quality of controlling of the friction clutch and to avoid the application of undesirable torque, it is proposed to compensate a hysteresis that arises between the target torque and the friction torque actually transmitted by the friction clutch along the actuation path by correcting a setpoint for controlling the clutch actuator with a corrective quantity.

14 Claims, 7 Drawing Sheets

METHOD FOR CONTROLLING A FRICTION CLUTCH AND DEVICE THEREFOR

This application is filed under 35 U.S.C, §120 and §365(c) as a continuation of International Patent Application No. PCT/DE2011/000140, filed Feb. 14, 2011, which application claims priority from German Patent Application No. 10 2010 010 138.9, filed Mar. 4, 2010, which applications are incorporated herein by reference in their entireties.

FIELD OF THE INVENTION

The invention relates to a method and device for controlling a friction clutch arranged between an internal combustion engine and a transmission by means of a friction clutch actuator that axially actuates an actuating element of the friction clutch along an actuation path associated, by means of a clutch characteristic, with a target torque that can be transmitted by means of the friction clutch.

BACKGROUND OF THE INVENTION

Methods and devices for automatically controlling friction clutches are known. The friction clutch is disengaged and engaged by a clutch actuator, where an actuating element such as a disc spring or another lever element is axially displaced by the clutch actuator along an actuation path, thereby controlling a friction lock between the friction clutch and friction linings of a clutch disc. The actuating element is, for example, displaced by pre-controlling the actuating element by means of the clutch actuator to a setpoint that corresponds to a desired target torque transferable via the friction clutch and is converted by the clutch actuator into the corresponding actuation path. The target torque formed from data of the driver's desired torque and operating data from the internal combustion engine are converted into the setpoint and then, finally, into the actuation path by using a clutch characteristic. This supplies the relationship between the target torque and the setpoint as an adaptable friction coefficient and takes into account the short-term and long-term changes to the friction clutch such as the sampling point at which the friction clutch starts transmitting torque and the maximum transmissible torque when the friction clutch is engaged. After the actuation path is pre-controlled, it is regulated by comparing the target and actual setpoint using a read-in actual value by means of a so-called position regulator. The engaged friction clutch can be regulated such that it is not completely engaged. Instead, for example, the torque provided by the internal combustion engine is transmitted including, if applicable, a safety margin. A slight amount of friction clutch slip is permissible here in order, for example, to attenuate torque peaks in the internal combustion engine.

It has been revealed that undesirable states of adhesion of the friction clutch and increased internal combustion engine speed can occur, which can be compensated by the position regulator but which necessarily arise from miscalculations of the method for controlling the friction clutch.

Thus, there is a long-felt need to develop methods for automatically controlling friction clutches and devices therefor.

BRIEF SUMMARY OF THE INVENTION

An object of the invention is to provide a method for controlling a friction clutch arranged between an internal combustion engine and a transmission, using a clutch actuator that axially actuates an actuating element of the friction clutch along an actuation path associated, by means of a clutch characteristic, with a target torque that can be transmitted by means of the friction clutch, where a hysteresis that arises between the target torque and actual torque along the actuation path is compensated, whereby a setpoint specified for controlling the clutch actuator is corrected by a correcting quantity. The setpoint is used for the clutch actuator, for example, by specifying an actuation path by applying a corresponding current or voltage signal to an electrically operated clutch actuator.

It has been revealed that compensating a hysteresis in the clutch actuator and friction clutch can at least partially reduce undesirable adhesion states and increase the speed of the internal combustion engine. A hysteresis is manifested by a delay in which the specified setpoint, such as the actuation path, is assumed so that, for example, the set target, torque can be reduced by up to 15%.

Consequently, the torque transmitted by the friction clutch is greater or, at best, equal to the set target torque due to the delay arising from controlling the target torque at smaller setpoints. When the hysteresis is not compensated, the friction clutch locks due to excess pressure. Such a state cannot be quickly controlled by the position regulator since such a change in torque does not cause an observable change in the detectable system variables. This can cause vibrations in the drivetrain with associated acoustic influences and loss of comfort, which can be avoided or reduced by correspondingly compensating the hysteresis.

When controlling the setpoints for greater target torques by compensating the hysteresis, a torque transmitted by the friction clutch that is reduced in relation to the target torque and leads to increased speed can be increased. Furthermore, by using hysteresis compensation, e.g., the slip control reliability at the friction clutch operating point can be improved by increasing the narrow modulation width of the target torque by means of the compensated specified setpoints, thereby attenuating the overall boost from the position regulator and thus allowing the slip control to be designed more stable overall and less sensitive to noise.

It has proven to be preferable to determine the correcting quantity in a hysteresis model that functions using relevant quantities of the friction clutch and clutch actuator. For example, the target torque to be applied, the speed of a setpoint change such as a change in the actuation path, a different path to be set, the adapted friction coefficient saved in the clutch characteristic, the current axial position of the actuating element and/or the like can be provided to reproduce and model a hysteresis in the clutch actuator and/or the friction clutch that affects the setpoint. The correcting quantity determined in the hysteresis model applies a positive offset in the direction of engagement and negative offset in the direction of disengagement of the friction clutch to increase the target torque in the direction of engagement and reduce it in the direction of disengagement.

It has been revealed that the clutch actuator can have a path-dependent hysteresis that, for example, remains constant over the entire actuation path, and the friction clutch can have a force or torque-dependent hysteresis that increases with the actuation force or with the transmitted torque. The correcting quantity is therefore preferably formed in two stages depending on an actuation path. The amount of the correcting quantity can rise slowly and then faster as the actuation path increases proceeding from a non-actuated clutch actuator at a zero point, where straight lines with different slopes can be superimposed, and a characteristic of the correcting quantity can be provided that rises in a parabolic, cubic or other manner over the actuation path.

It has proven to be preferable when the corrective quantity remains constant along a first section of the actuation path up to a sampling point of the friction clutch, and then rises along a second section of the actuation path. This can compensate the substantially constant hysteresis of the clutch actuator over the actuation path. Once the sampling point is reached, the hysteresis of the clutch actuator overlaps the hysteresis of the friction clutch transmitting the torque as of the scanning point which increases as the transmitted torque increases and is correspondingly compensated with a compensation curve of the corrective quantity that rises over the corresponding section, or with a transmitted torque assignable thereto, with the applied setpoint and/or the underlying target torque. The shape of this compensation curve can be a straight line, parabola, cubic, a free form adapted to the hysteresis behavior and derived from the clutch behavior, or the like.

The level of the corrective quantity can be limited in comparison to the non-hysteresis-compensated setpoint to restrict the influence of the corrective quantity. This restriction can be absolute or relative and dependent on a determined overall hysteresis. The corrective quantity can, for example, be restricted to one-half of the maximum arising hysteresis.

The hysteresis is preferably compensated by overlapping the corrective quantity with a setpoint created for an ideal process without a hysteresis. Corresponding hysteresis models are preferably used m the direction of engagement and direction of disengagement that, for example, form corresponding hysteresis characteristic curves. The amount of the underlying characteristics of the corrective quantities can be the same for the direction of engagement and disengagement. Alternately, different compensation models can be used for the direction of disengagement and the direction of engagement when the hysteresis behavior differs. Such partial characteristics proceed from a zero point for the actuation path in the direction of engagement and for the actuation path in the direction of disengagement of the friction clutch, for example, the momentary operating point of the friction clutch, and are formed in opposite directions with reference thereto. This means that when the direction of the actuation path reverses, the corrective quantity is applied in the opposite direction starting at the zero point.

In one embodiment, two hysteresis branches for the disengagement and engagement process of the friction clutch can he provided in the hysteresis compensation method that each correspond to a clutch characteristic dependent on the corrective value and are each provided with a specified range of tolerance. Forming tolerance ranges prevents the hysteresis branches from switching when there are small changes in the path of the clutch actuator; consequently, a switch is made to the other clutch characteristic when the clutch actuator reverses direction only when the tolerance range of the one clutch characteristic is exceeded by the setpoint corrected with the corrective quantity. When creating the hysteresis branches in the form of two separating clutch characteristics, a friction clutch sampling point is specified on the clutch characteristic or hysteresis branch for the direction of engagement of the friction clutch.

In one embodiment, the corrective quantity can be adapted to the behavior of the clutch actuator and/or friction clutch as it changes over time. The corrective quantity or its characteristic can be adapted to a friction clutch operating point that changes over time while the transmissible torque preferably remains the same. For example, a setpoint provided with a corrective quantity can be adapted with the maximum transmissible torque when the clutch characteristic has preferably already been adapted. It has proven to be preferable to first adapt the corrective quantity or its characteristic in a path section in which only the hysteresis of the clutch actuator is active. The additionally active friction clutch hysteresis over large actuation paths can be adapted taking into account the adapted clutch actuator hysteresis given the maximum transmissible torque or the maximum actuation path by, for example, correcting the corrective quantity arising from comparing the existing compensated setpoint with the target, torque taking into account the adapted clutch characteristic.

Another object of the invention is to provide a device for actuating a friction clutch that is effectively arranged between an internal combustion engine and a transmission and has a clutch actuator which axially displaces an actuating element of the friction clutch along an actuation path and a control unit to control the clutch actuator that executes the described method.

BRIEF DESCRIPTION OF THE SEVERAL VIEWS OF THE DRAWING

The nature and mode of operation of the present invention will now be more fully described in the following detailed description of the invention taken with the accompanying drawing figures, in which;

FIG. 10 is a flowchart with hysteresis compensation incorporated in a clutch control system; and.

FIG. 11 is a flowchart of an overview of hysteresis compensation.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the Invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
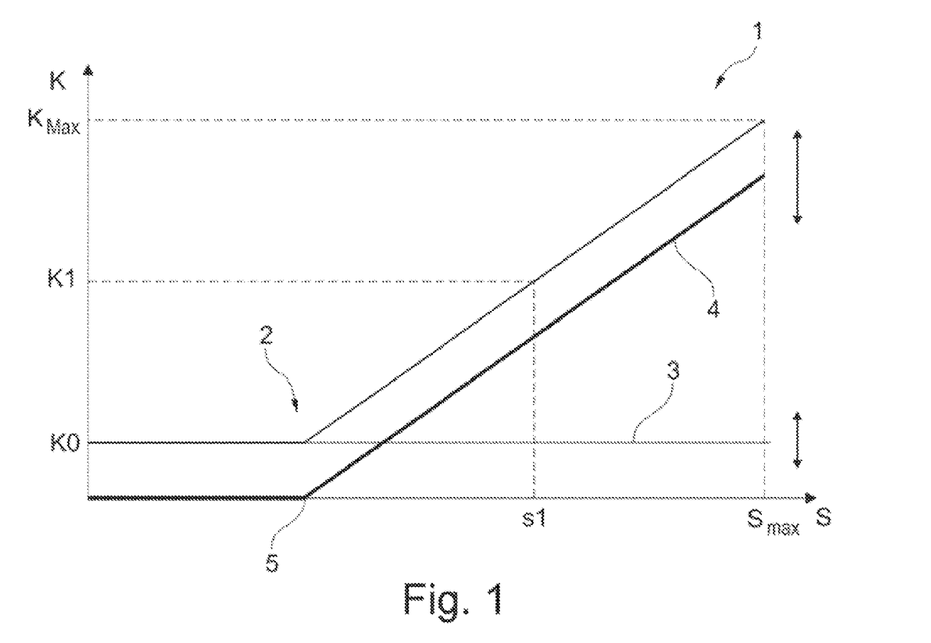
FIG. 1 is a diagram of a hysteresis model that compensates the hysteresis of the clutch actuator and friction clutch.

FIG. 1 shows a graph with maximum corrective quantity K over actuation path s in one direction of the actuation path. Hysteresis characteristic 2 is in two parts that includes section 3, which remains constant over actuation path s that is ascribed to the hysteresis of the clutch actuator, and section 4 that increases along the actuation path and that starts at sampling point 5 of the friction clutch where it starts to transmit torque. Corrective quantity K1 is added as an offset along, e.g., specified actuation path s1 to the uncompensated setpoint representing target torque to be transmitted by the friction clutch to control the clutch actuator. Corrective quantify K0 specified for section 3 is adaptable. This means that it can be adapted to a change. The adaptation is preferably made for smaller actuation paths s under sampling point 5. Detected or calculated quantities are evaluated for the adaptation that can also be used to adapt the coefficient of friction of the clutch characteristic, such as the calculated torque error. Alternatively or in addition, a rotational speed can be predicted by a drivetrain monitor, the deviation of which from the actually determined rotational speed of the internal combustion engine or transmission input shaft serves to adapt corrective quantity K0. Once section 3 has been adapted by correcting the ordinate section, section 4 can be adapted by, for example, comparing the maximum setpoint with the maximum corrective quantity KMax for a maximum actuation path smax and completely engaged friction clutch.

Figure 2:
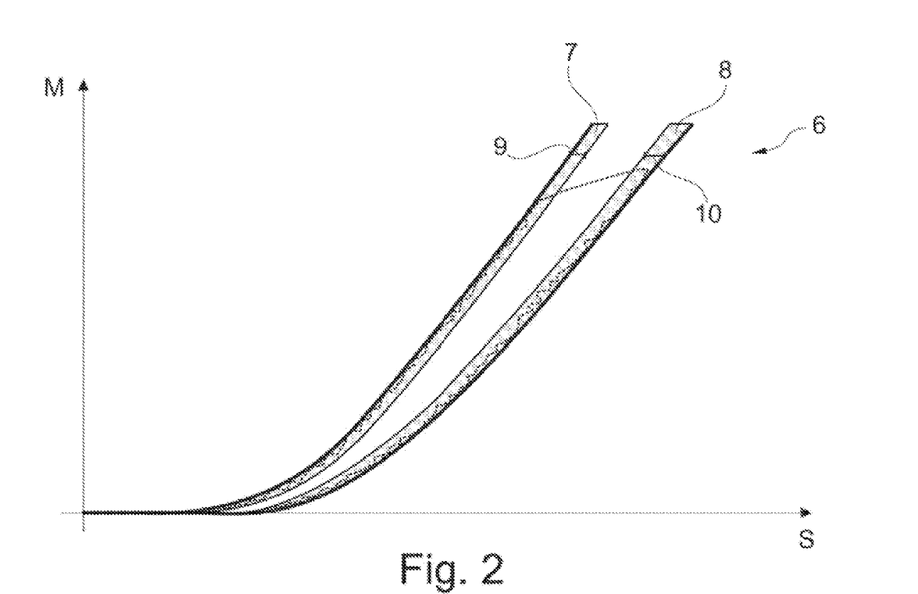
FIG. 2 is a diagram of two hysteresis branches with tolerance ranges.

FIG. 2 shows graph 6 to illustrate hysteresis compensation from the perspective of torque M transmitted by friction clutch over actuation path s. Clutch characteristic 7, 8 is provided with tolerance ranges 9, 10, arid both clutch characteristics 7, 8 are offset from each other by specified hysteresis range (K from FIG. 1) along actuation path s. Clutch characteristic 8 is specified for the direction of engagement of the friction clutch and specifies a corresponding actuation path section corresponding to tolerance range 10. Clutch characteristic 7 is provided in the same manner for the direction of disengagement. Of course characteristics 7, 8 change depending on the design of the friction clutch as a friction clutch which is necessarily engaged or necessarily disengaged by the clutch actuator.

According to formed tolerance ranges 9, 10, the hysteresis branches of clutch characteristics 7, 8 delimiting the partial hysteresis loops spread, and a plurality of data points are accordingly available to formulate the adaptation. The corrective quantities are adapted in one embodiment, taking into account tolerance ranges 9, 10.

The sampling point is preferably adapted to clutch characteristic 8 provided for the engaging process of the -friction clutch so that the sampling point can he approached without, additional hysteresis when the friction clutch engages, to avoid impact between "clutch is disengaged" and "clutch is transmitting torque". Contrastingly, a soft transition is desired. Since there is no known path-dependent hysteresis of the clutch actuator when the clutch actuator is first activated at the end of the belt, the sampling point can be easily learned as a real measuring point lying on characteristic 8. To comfortably operate the friction clutch, the hysteresis branch, such as clutch characteristic 8, for engaging the friction clutch is more important than the hysteresis branch for disengaging the friction clutch since the contacting of the friction clutch can be positioned precisely at the sampling point to prevent noticeable impact, and since the creep can be precisely adjusted by applying a corresponding corrective quantity. For economic reasons and/or to simplify computation, the compensation of the friction clutch during the disengagement of the friction clutch can be dispensed with, if desired.

Figure 3:
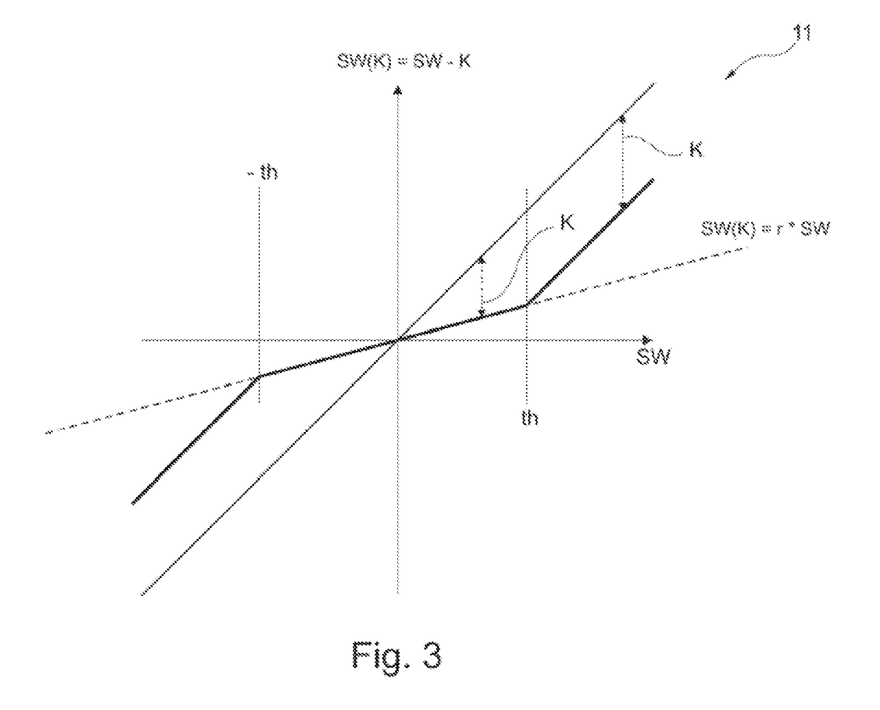
FIG. 3 is a diagram of a two-stage hysteresis model.

FIG. 3 shows graph 11 of a hysteresis model that is altered and portrayed differently in comparison to FIG. 1 for determining partial loop and full loop behavior when uncompensated setpoint SW is plotted against setpoint SW(K) compensated with the corrective quantity. The angle bisector of the coordinate system is shown in the form of ideal, hysteresis-tree setpoint curve 12 without a hysteresis. When the value of compensated setpoint SW(K) is high in comparison to hysteresis-free setpoint curve 12, it is reduced, for example, to one-half the value of overall hysteresis hy indicated by double arrow 13. The portrayed coordinate system is a moving coordinate system with a zero point that can be displaced along the axis of actuation, path s.

If the clutch actuator reverses direction, the coordinate system is mathematically shifted to the operating point of the friction clutch so that the zero point of the coordinate system, depending on the engaging or disengaging direction of the friction clutch, is made to coincide with one of hysteresis thresholds th. Randomly selected ratio r describes the relationship between the output signal of compensated setpoints SW(K) and input signal SW between two hysteresis thresholds −th and th. The ratio is set in this instance in the form of a straight line with a preferred slope greater than 0.5. Consequently, the following results for hysteresis threshold th:

$$th=hy/(2*(1-r)).$$

Such a coordinate transformation can be easily described algorithmic-ally in a software routine where the coordinate system is shifted such that setpoint SW (=mf) in the moving coordinate system is restricted between two hysteresis thresholds th, −th. From this restriction, the following results for corrective quantity K:

$$K=(1-r)*mf$$

The corrective quantity is thereby automatically adapted when a specified set point range is left during a reverse in direction. Corrective quantity K can be implemented as a characteristic map in a software algorithm and cannot supply nonphysical values. A comparison with real measured quantities is unnecessary and cannot assume impermissible values.

Figure 4:
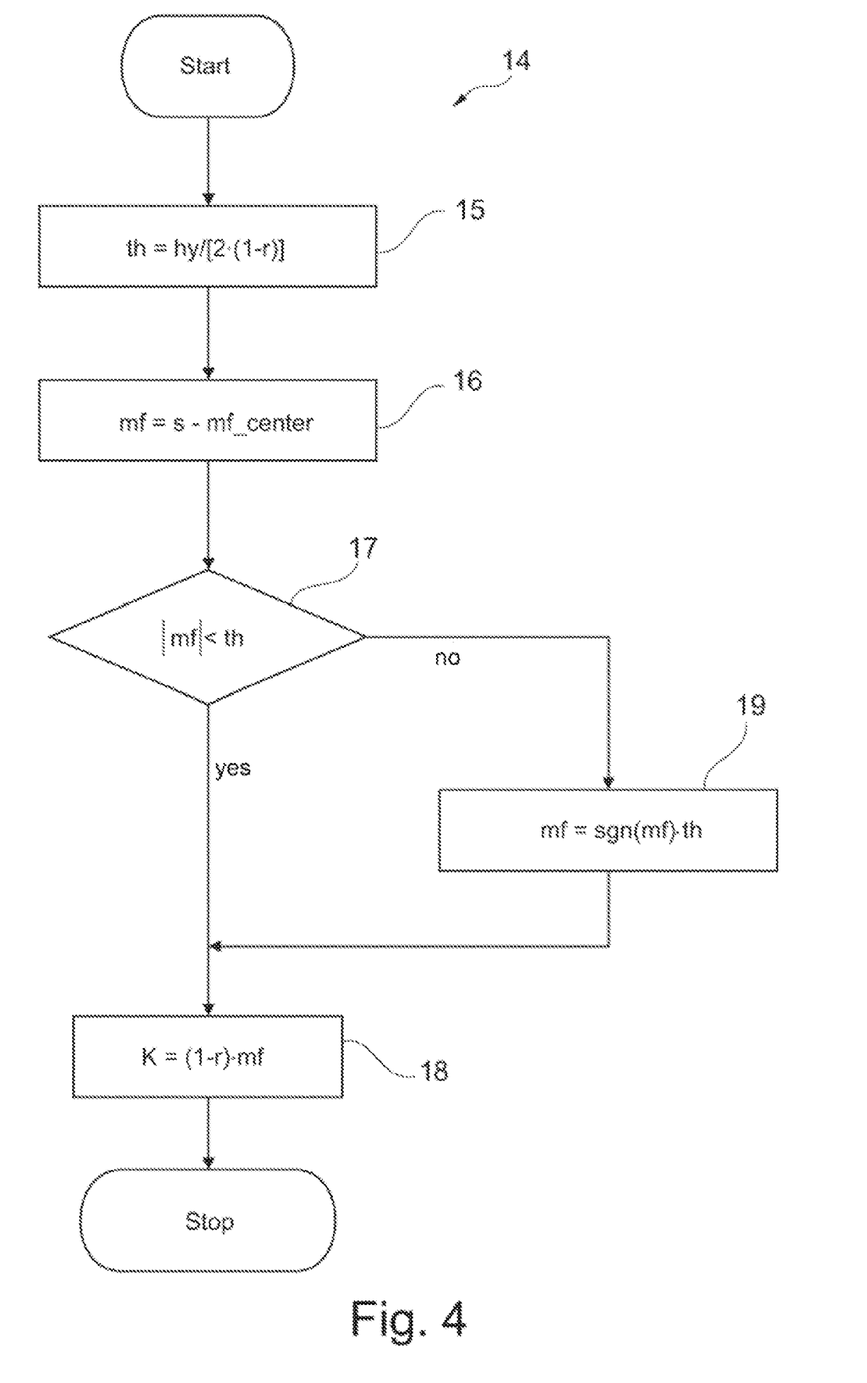
FIG. 4 is a flowchart of the hysteresis model of FIG. 3.

FIG. 4 shows one embodiment as flowchart 14 for implementing the hysteresis model in FIG. 3. After starting, hysteresis threshold th is adjusted in block 15 depending on overall hysteresis hy which is dependent on the set actuation path and/or the torque transmitted by the friction clutch and ratio r. In block 16, new setpoint SW (=mf) in the moving coordinate system is calculated as the difference between actuation path s and current zero point mf_center of the moving coordinate system. In branch 17, a check is performed of whether the amount of setpoint SW is less than hysteresis threshold th. If this is the case, corrective quantity K is calculated in block 18 and added to the setpoint in the control routine for the clutch actuator. If the amount of setpoint SW is greater than hysteresis threshold th, setpoint SW is limited in block 19, and the zero point of the coordinate system is shifted by the limitation value. This means that the coordinate system in FIG. 3 is adapted to actuation path s or other potential input signals such as the target torque, the target path or corresponding actual values.

Figure 5:
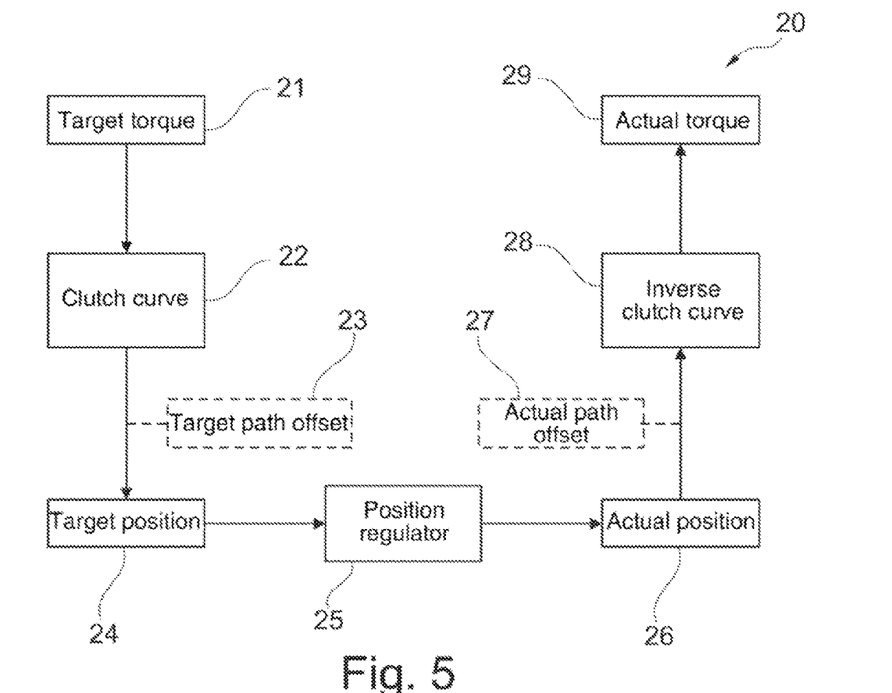
FIG. 5 is a block model of a hysteresis correction.

FIG. 5 shows flow chart 20 which reproduces the process of controlling a clutch actuator. The target torque to be transmitted by the friction clutch is calculated in block 21, for example, from data from the internal combustion engine, the driver's desired torque available, for example, from an accelerator, and the like. Using the clutch curve such as the clutch characteristic in block 22, the target torque is assigned to a setpoint for the friction clutch actuation path. In block 23, the corrective quantity for hysteresis compensation, in this case as the target path offset, is added to the setpoint, and the target position of the actuation path is approached in block 24 controlled by the clutch actuator. The position regulator in block 25 regulates the pre-controlled position and maintains it against external influences. In block 26, the actual value is determined, for example, by means of corresponding sensors, in this case in the form of the actual position of clutch actuator or the actual path that it has traveled. After subtracting an actual path offset in block 27, the actual value which is uncompensated with reference to the hysteresis undergoes reduction in block 28 by an inverse clutch curve that supplies the actual torque in block 29 which is compared with the target torque of block 21 so that the target torque can be adapted, if necessary.

A target path offset from a target model is added to the nominal target path. An actual path offset from an actual model is then subtracted from the actual path. When the actuation path changes slowly as the actual path is following the target path, the target and actual correction are shortened and basically cut out, and the actual torque follows the target torque. In the case of faster changes, the target and actual offset can be quite different and even completely out of phase. The clutch characteristic (clutch curve) adapted based on the actual torque is not directly influenced by the offsets of the hysteresis model. The adaptation is more or less faced with "cleaned up" clutch behavior. Of course, the effect of the hysteresis model can he implemented on the level of the target torque in the clutch actuator controls.

Figure 6:
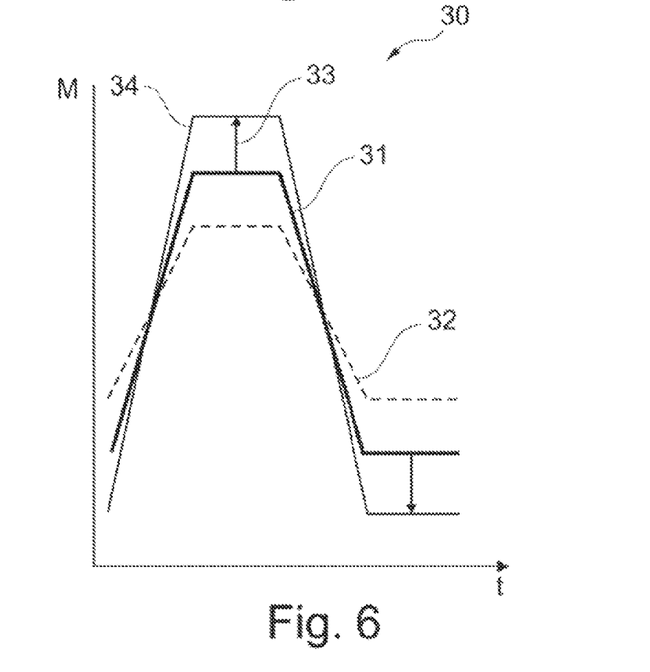
FIG. 6 is a diagram for clarifying hysteresis compensation.

The graph 30 in FIG. 6 shows the curve over time of a change in torque M transmissible by the friction clutch in relation to time t while the friction clutch is being actuated along the actuation path of the clutch actuator. When the clutch actuator moves slowly, the actual path achieved immediately follows the target path; consequently, the actual path basically corresponds to the target path in portrayed graph 30. Continuous line 31 indicates the uncompensated specified target with hysteresis compensation. The torque with the hysteresis is indicated in the form of dashed line 32. The adaptation of the clutch characteristic is based on the detection of the actual value and, in this case, the recognized adaptation value is too high when the torque increases and too low when the torque decreases, for example, an adaptable friction coefficient in the clutch characteristic.

If the corrective quantity is supplied to the setpoint as added in the form of arrow 33 and is not observed by a corresponding adaptation routine, the friction clutch continues to travel in the direction of closing in correspondence with the original target torque as indicated by continuous line 34. If the hysteresis model is correctly attuned, the torque adjusted to the friction clutch corresponds with the change in torque in line 31 during slow travel and hence the target torque. To correct the processes in the entire control routine of the clutch actuator, the detected actual torque is corrected by the same amount of the corrective quantity of the hysteresis model so that the actual and target values correspond.

If the hysteresis model is not adjusted strongly enough, the corrective quantities are too small, and the adaptation routine for the clutch characteristic continues to manifest the above behavior. If die corrective quantity is too large, the adaptation routine detects a friction value that is too low when the torque increases and too high when the torque decreases.

Figure 7:
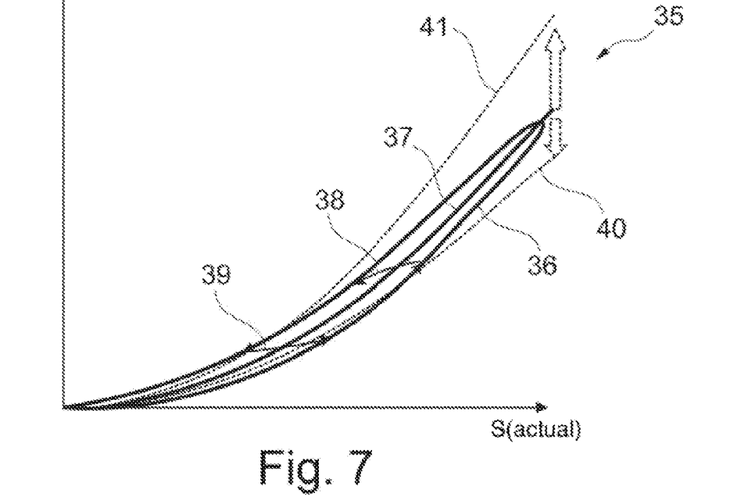
FIG. 7 is a graph of a clutch characteristic with an adaptation of the coefficient of friction and a hysteresis loop.

FIG. 7 shows graph 35 of the non-hysteresis-compensated torque M over the actual path s(ist) with ideal clutch characteristic 37 without a hysteresis, and real clutch characteristic 36 with a hysteresis. If clutch characteristic 36 does not travel over the entire actual path, partial hysteresis loops arise that are indicated by arrows 38, 39 during which a reversal of the hysteresis direction occurs. Dashed-line clutch characteristic 40 is adapted from clutch characteristic 37 following an adaptation of the friction coefficient after a significant rise in torque, and clutch characteristic 41 is adapted after a significant reduction of torque. A "significant change" is to be understood in this context as a change in torque in which the partial loop area is left, and the torque is adjacent to torque characteristic 36. It is clear that without hysteresis compensation, all adapted clutch characteristics lie below ideal clutch characteristic 37 when there is a rise in torque, and all adapted characteristics lie above ideal clutch characteristic 37 when there is a reduction of torque.

When a hysteresis model is used, the corrective quantity is added to the setpoint, such as the target position, when the torque increases to achieve the nominal torque of clutch characteristic 37. Adapting clutch characteristic 37 then no longer causes ideal clutch characteristic 37 to change. The behavior of the hysteresis model is equivalent when the torque decreases.

Figure 8:
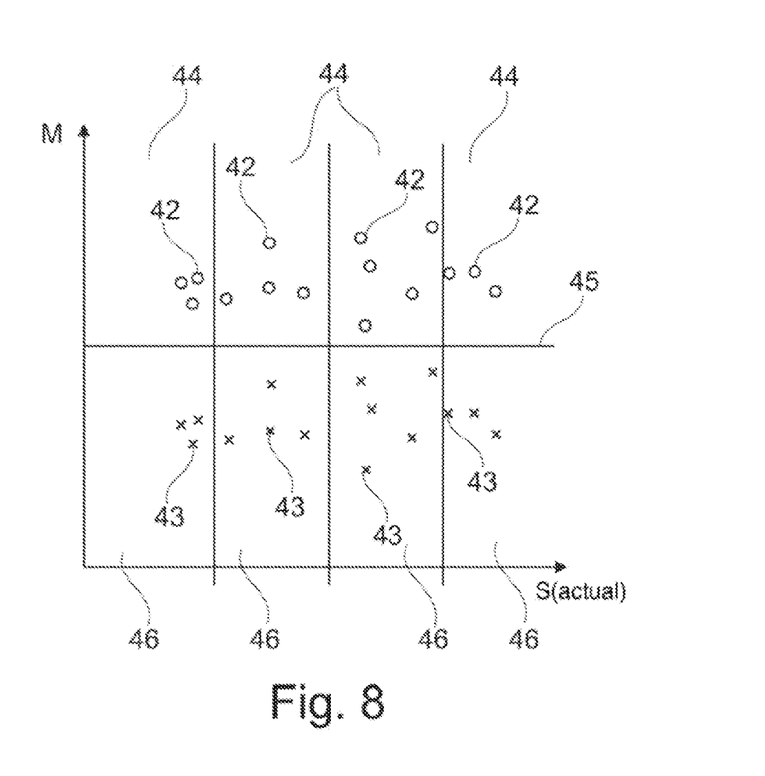
FIG. 8 is a statistical distribution of the coefficients of a friction adaptation.

FIG. 8 shows a statistical distribution of friction values 42, 43 adapted to torque M over the actual path s(ist). The torque values can be adapted corresponding to the actual paths. Detected friction values 42, 43 portrayed as discrete points are divided into adaptation areas 44, 46 in which the type of hysteresis compensation changes, for example, a change in level in a multilevel hysteresis model.

The indicated adapted friction coefficients are restricted, to values that have exceeded hysteresis threshold th, −th (shown in FIG. 3). Individual friction coefficients 42, 43 are additionally divided by dividing line 45 and are hence assigned to different hysteresis thresholds th, −th, and are hence discreetly assigned to the engagement and disengagement direction of the friction clutch. If when VZ(mf)=+1 and VZ(mf)=−1, the difference between the expected values of displacement value mf is greater than the sum of the corresponding standard deviations, then the overall hysteresis in this area needs to be increased.

If the difference between the expected, values of the friction coefficients in the direction of engagement and disengagement in adaptation area 44, 46 is greater than sum of the corresponding standard deviations, then the overall hysteresis in this adaptation area needs to be reduced. If there is no adaptation in adaptation area 44, 46 over a long time, the corrective value of the hysteresis is continuously interpolated between the neighboring adaptation areas, or extrapolated into one or both neighboring adaptation areas. In addition, general observations of continuity and monotony can be incorporated in the adaptation. Since adaptation is scarcely possible, if the assumed hysteresis is excessively large, the overall hysteresis should be decremented over time for reasons of safety to ensure a finite probability of return.

Figure 9:
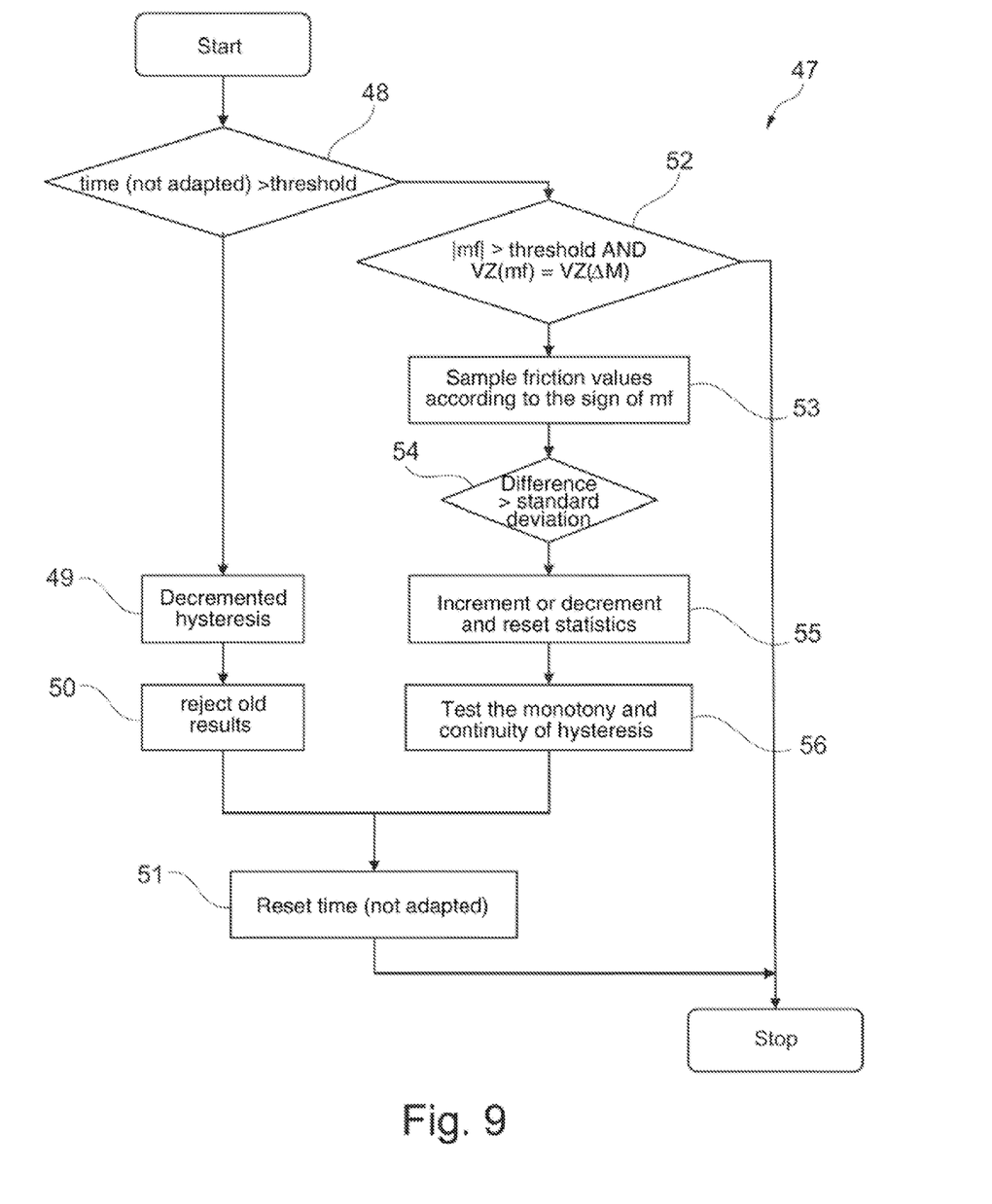
FIG. 9 is a flowchart of a hysteresis adaptation.

FIG. 9 shows flowchart 47 that illustrates a possible routine for adapting the hysteresis model, for example, by means of corrective quantities to be used over the actuation path. After starting, the duration since the last adaptation is queried in branch 48. If the duration exceeds a specified threshold, the hysteresis is decremented in block 49, and the adaptation data saved in block 50 are discarded. In block 51, the time until repeating the adaptation is restarted, and the routine is then terminated and restarted if desired.

If the duration of the adaptation lies within the set threshold, the adaptation requirements are reviewed in branch 52 based on the statistical information in FIG. 8. If the adaptation conditions are not satisfied, the routine is terminated.

If displacement value mf exceeds a specified threshold, and if expected values VZ(mf) of displacement value mf correspond to expected values VZ(ΔM) of the associated change in torque, the adaptation criteria are satisfied, and the friction coefficients are statistically classified in block 53 corresponding to FIG. 8. In branch 54, the routine is terminated if the friction coefficients lie within the standard deviation. If there is a significant deviation of the friction coefficients, the determined deviations of the adaptation are used as a basis in block 55, the monotony and continuity criteria of the hysteresis model are tested in block 56, and the routine is terminated in block 51.

Figures 10, 11:
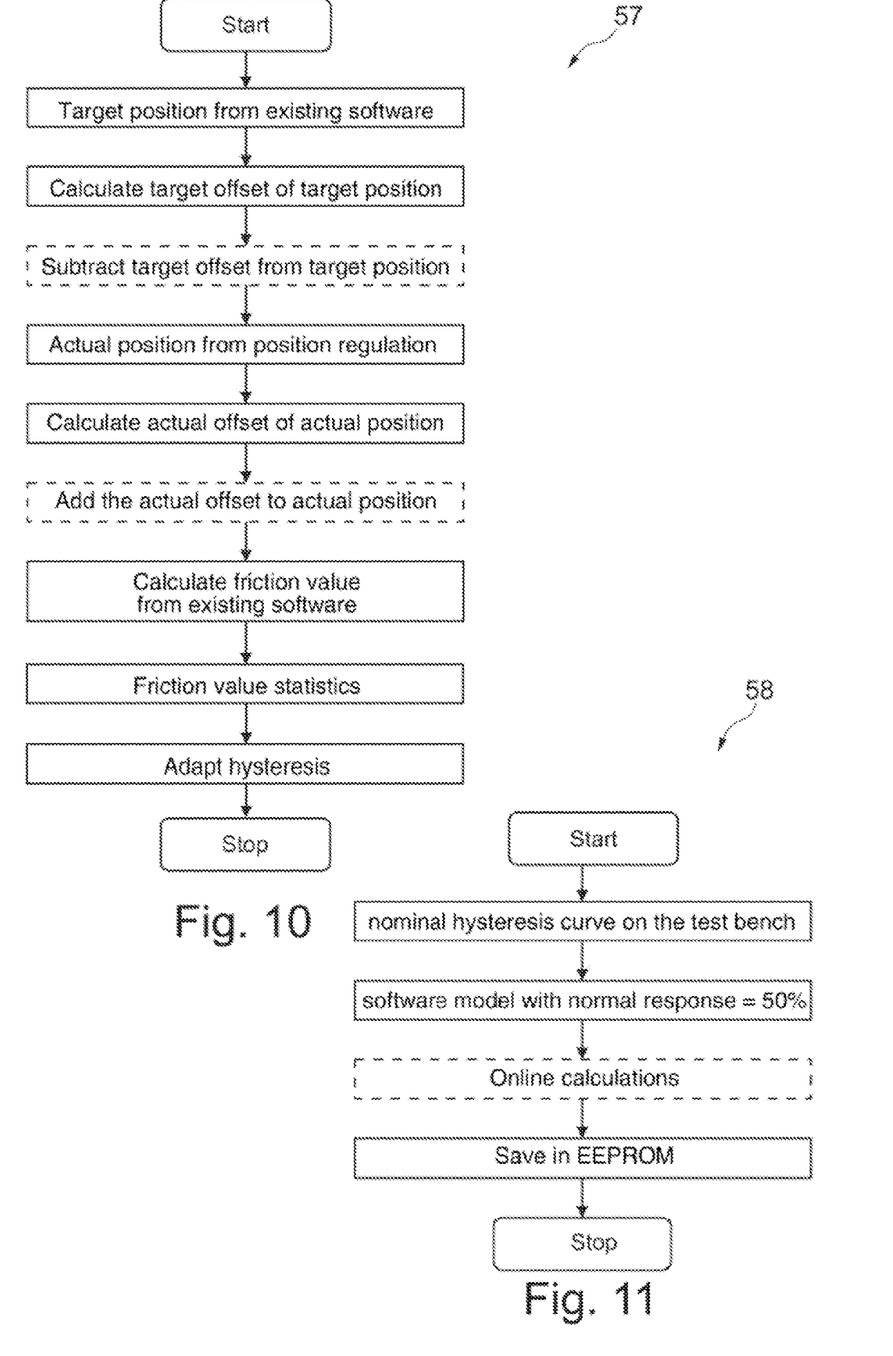

FIG. 10 shows flowchart 57 of a routine for determining a corrective quantity of a hysteresis model that runs parallel to the other routine for controlling the clutch actuator. The blocks shown with the solid and dashed outlines illustrate an exchange of data with the routine for controlling the clutch actuator. For example, the target position determined from the clutch characteristic and target torque is read in from the existing software and is used to calculate the target offset in the form of the corrective variable from the set hysteresis model, for example, the hysteresis model in FIGS. 1 and 3. The corrective quantity is subtracted from or added to the target position depending on the change in torque. Then, the actual position of the clutch actuator is read in, the hysteresis-related offset is eliminated from the actual position. The following calculation of the friction coefficient takes into consideration the friction coefficient statistics, and then the hysteresis or corrective quantity thereof is adapted, if necessary.

FIG. 11 shows one embodiment of the creation of a routine for hysteresis compensation in the form of flowchart 58 with the tasks shown in die following blocks. For example, in descending sequence, these are; the reading in of a hysteresis curve, for example, from the empirically obtained data of a test bench, the depiction of these data In a hysteresis model (SW model) that preferably uses a ratio of r=50%, calculations of the hysteresis data of the automated friction clutch in operation, for example, initial adaptation processes, and the saving of the first operating data in a non-volatile memory (EEPROM) of the control unit.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

List of Reference Numbers
1 Diagram
2 Hysteresis characteristic
3 Section
4 Section
5 Sampling point
6 Diagram
7 Clutch characteristic
8 Clutch characteristic
9 Tolerance range
10 Tolerance range
11 Diagram
12 Hysteresis-free setpoint line
13 Double arrow
14 Flowchart
15 Block
16 Block
17 Branch
18 Block
19 Block
20 Flowchart
21 Block
22 Block
23 Block
24 Block
25 Block
26 Block
27 Block
28 Block
29 Block
30 Diagram
31 Line
32 Line
33 Arrow
34 Line
35 Diagram
36 Clutch characteristic
37 Clutch characteristic
38 Arrow
39 Arrow
40 Clutch characteristic.
41 Clutch characteristic
42 Friction coefficient
43 Friction coefficient
44 Adaptation area
45 Dividing line
46 Adaptation area
47 Flowchart
48 Branch
49 Block
50 Block
51 Block
52 Branch
53 Block
54 Branch
55 Block
56 Block
57 Flowchart.
58 Flowchart
$\Delta$in Change in the input signal
$\Delta$m Change in the amount of displacement
hy Overall hysteresis
K Corrective quantity
K0 Corrective quantity
K1 Collective quantity
KMax Maximum corrective quantity
M Torque
mf Setpoint SW within the moving coordinate system
mf_center Zero point of the moving coordinate system
r Ratio
s Actuation path
s1 Actuation path
s(ist) Actual path
smax Maximum actuation path
SW Setpoint (=mf)
SW(K) Compensated setpoint
t Time
th Hysteresis threshold
hy Overall hysteresis
VZ($\Delta$M) Anticipated value of the torque change
VZ(mf) Anticipated displacement value

What is claimed is:

1. A method for controlling a friction clutch arranged between an internal combustion engine and a transmission, the method comprising the following steps:
axially actuating, with a clutch actuator, an actuating element of the friction clutch in a first direction along an actuation path associated, by means of a clutch characteristic, with a target torque that can be transmitted by means of the friction clutch; and, compensating a hysteresis that arises between the target torque and an actual torque along the actuation path that is actually transmitted by the friction clutch by correcting a setpoint (SW) specified for controlling the clutch actuator with a correcting quantity (K), wherein the correcting quantity is constant or increasing during the axial actuation of the actuating element.

2. The method as recited in claim 1, further comprising determining the correcting quantity (K) in a hysteresis model that works with the relative quantities of the friction clutch and clutch actuator.

3. The method as recited in claim 1, further comprising forming the correcting quantity (K) in two stages depending on the actuation path.

4. The method as recited in claim 3, further comprising maintaining the correcting quantity (K) constant along a first path section of the actuation path up to a sampling point (5) of the friction clutch, and then rising the correcting quantity along a second path section of the actuation path.

5. The method as recited in claim 3, further comprising maintaining the correcting quantity (K) constant along a first path section of the actuation path up to a sampling point (5) of the friction clutch, and then rising the correcting quantity as the transmissible torque increases.

6. The method as recited in claim 1, further comprising providing characteristics that run in opposite directions for the correcting quantity and proceed from a zero point for the actuation path in the direction of engagement and for the actuation path in the direction of disengagement of the friction clutch.

7. The method as recited in claim 6, further comprising when the direction of the actuation path reverses, applying the correcting quantity in the opposite direction starting at the zero point.

8. The method as recited in claim 6, further comprising forming a clutch characteristic that depends upon the correcting value for the disengagement and engagement process of the friction clutch and that has a specified tolerance range in each case.

9. The method as recited in claim 8, further comprising specifying a sampling point of the friction clutch on the clutch characteristic for the engagement direction of the friction clutch.

10. The method as recited in claim 1, further comprising adapting the correcting quantity (K) to the behavior of the clutch actuator or the friction clutch which changes over time.

11. The method as recited in claim 1, further comprising adapting the correcting quantity (K) to the behavior of the clutch actuator and the friction clutch which changes over time.

12. The method as recited in claim 10, further comprising adapting the correcting quantity (K) to an operating point of the friction clutch which changes over time.

13. A device for actuating a friction clutch that is effectively arranged between an internal combustion engine and a transmission, comprising:

a clutch actuator which axially displaces an actuating element of the friction clutch along an actuation path; and, a control unit to control the clutch actuator that executes a method comprising the following steps:

axially actuating, using the clutch actuator, the actuating element of the friction clutch along the actuation path associated, by means of a clutch characteristic, with a target torque that can be transmitted by means of the friction clutch; and, compensating a hysteresis that arises between the target torque and an actual torque along the actuation path that is actually transmitted by the friction clutch by correcting a setpoint (SW) specified for controlling the clutch actuator with a correcting quantity (K), wherein:

the actuation path has a beginning point and an end point;

during a first stage of closing the friction clutch and compensating for the hysteresis:

the actuating element displaces from the beginning point to a first point along the actuation path between the beginning point and the end point; and, the correcting quantity is constant; and, during a second stage of closing the friction clutch and compensating for the hysteresis:

the actuating element displaces from the first point to the end point; and, the correcting quantity steadily increases.

14. A device for actuating a friction clutch that is effectively arranged between an internal combustion engine and a transmission, comprising:

an actuating element of the friction clutch;

a clutch actuator arranged to axially displace the actuating element along an actuation path in first and second opposite directions to open and close the friction clutch, respectively; and, a control unit configured to:

compensate, when the actuator is displacing the actuating element in the first direction along the actuation path to close the clutch, hysteresis between a target torque and torque actually transmitted by the friction clutch along the actuation path by correcting a setpoint for controlling the clutch actuator with a correcting quantity; and, when the actuator is displacing the actuating element in the second direction along the actuation path to open the clutch, correcting the setpoint for controlling the clutch actuator with the correcting quantity.

* * * * *